United States Patent [19]

Petroff et al.

[11] Patent Number: 5,180,195
[45] Date of Patent: Jan. 19, 1993

[54] JOINT LOCKING SYSTEM FOR PIPE

[75] Inventors: Larry J. Petroff, Duluth, Ga.; James H. Miller, Reno, Nev.

[73] Assignee: Chevron Research and Technology Company, San Francisco, Calif.

[21] Appl. No.: 727,772

[22] Filed: Jul. 10, 1991

[51] Int. Cl.$^5$ .............................................. F16L 21/02
[52] U.S. Cl. .................... 285/231; 285/291; 285/915
[58] Field of Search ............... 285/230, 231, 291, 915; 277/207 A

[56] References Cited

U.S. PATENT DOCUMENTS

| | | | |
|---|---|---|---|
| 2,889,582 | 6/1959 | Cooper | 285/291 X |
| 3,059,941 | 10/1962 | Kaynor et al. | 285/291 X |
| 3,519,283 | 7/1970 | Tashlick et al. | 285/291 X |
| 3,667,785 | 6/1972 | Kapeker | 285/291 X |
| 3,830,530 | 8/1974 | Glover | 285/231 X |
| 3,848,904 | 11/1974 | Anderson | 265/291 X |
| 4,067,534 | 1/1978 | Frey | 285/291 X |
| 4,124,422 | 11/1978 | Kusano | 285/291 X |

FOREIGN PATENT DOCUMENTS 757521  4/1967  Canada ................. 285/230

*Primary Examiner*—Dave W. Arola
*Attorney, Agent, or Firm*—Richard J. Sheridan; Tom G. DeJonghe

[57] ABSTRACT

Disclosed is a joint system for connecting a smooth walled end portion of a pipe to fittings or other pipe. The smooth walled end portion of the pipe has a gasket attached thereto which covers a portion of the end of the pipe and a portion of the outer surface of the pipe adjacent to the end. The fitting or other pipe has a bell end attached thereto with the inner surface of the bell provided with cylindrical surfaces of different diameters separated by a surface perpendicular thereto. When the joint is assembled, the gasket engages a cylindrical surface and the perpendicular surface.

7 Claims, 2 Drawing Sheets

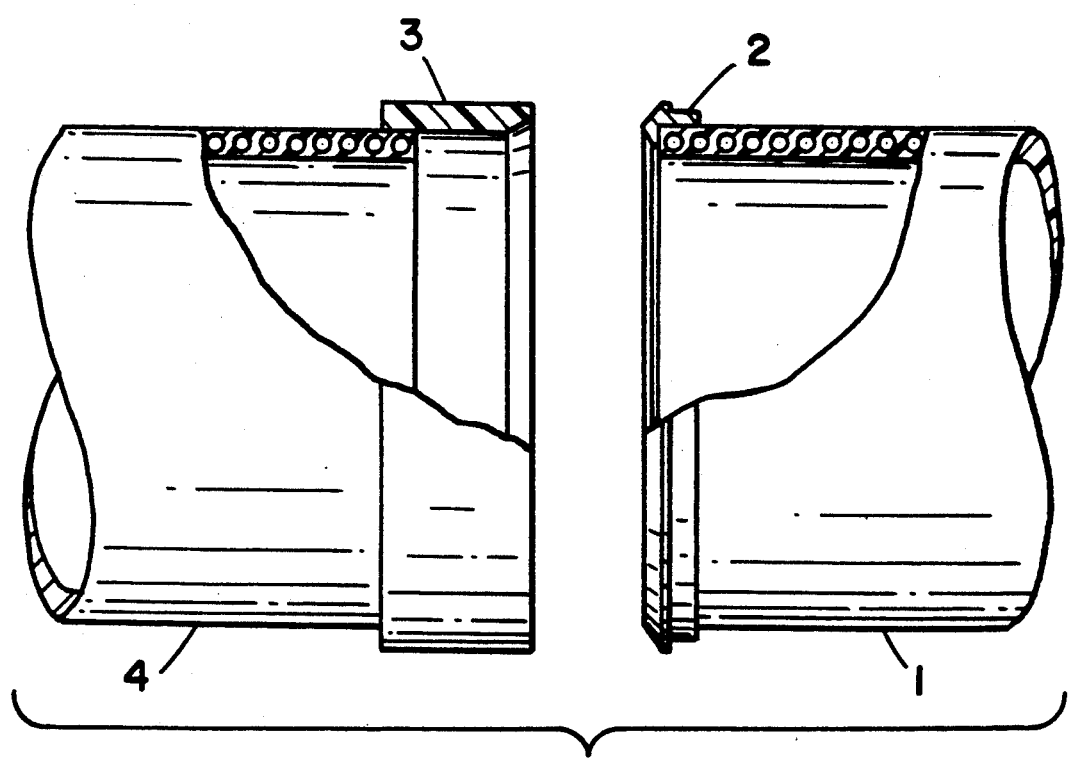
FIG_1
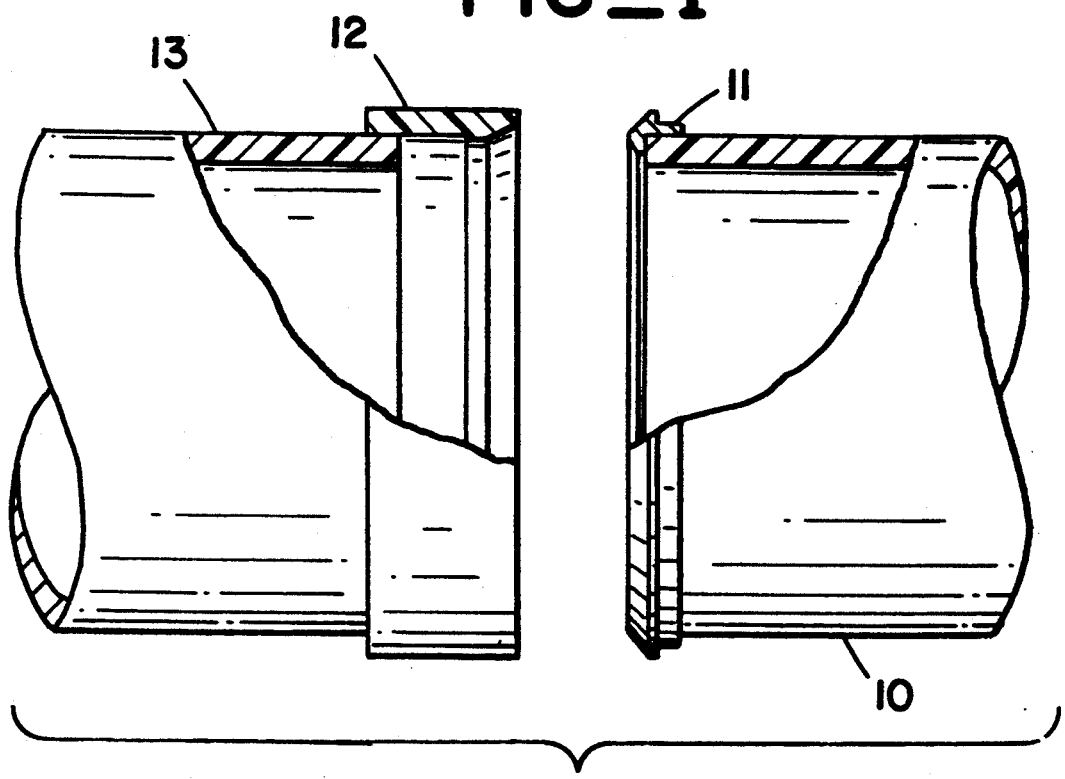
FIG_2

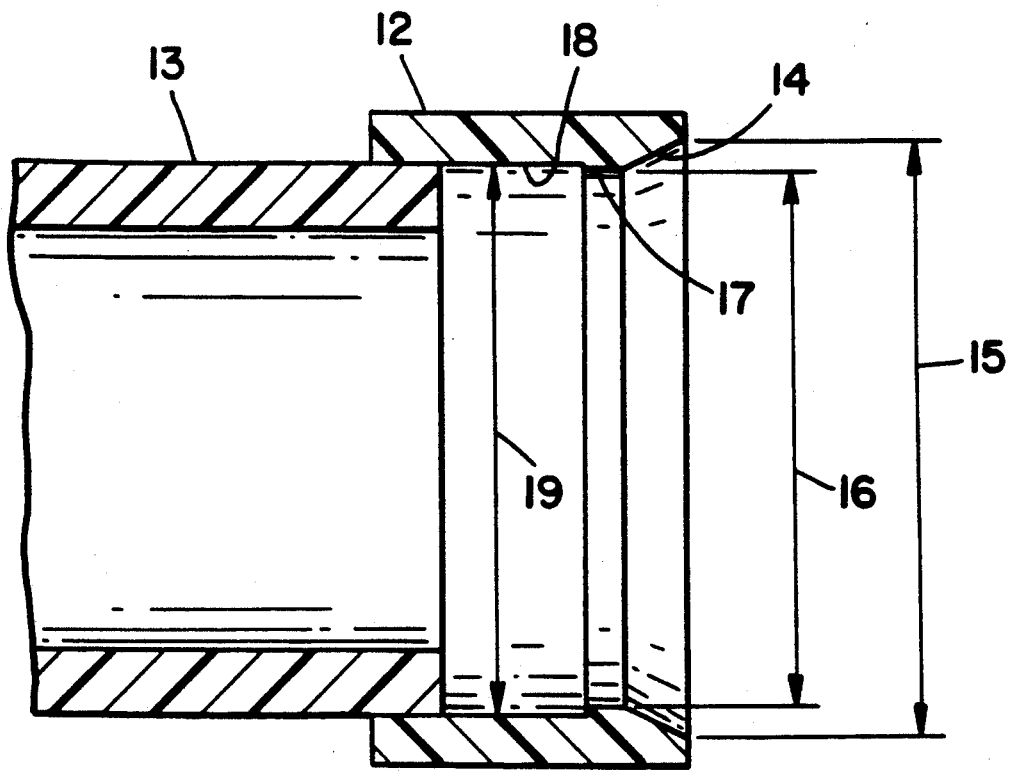
FIG_3
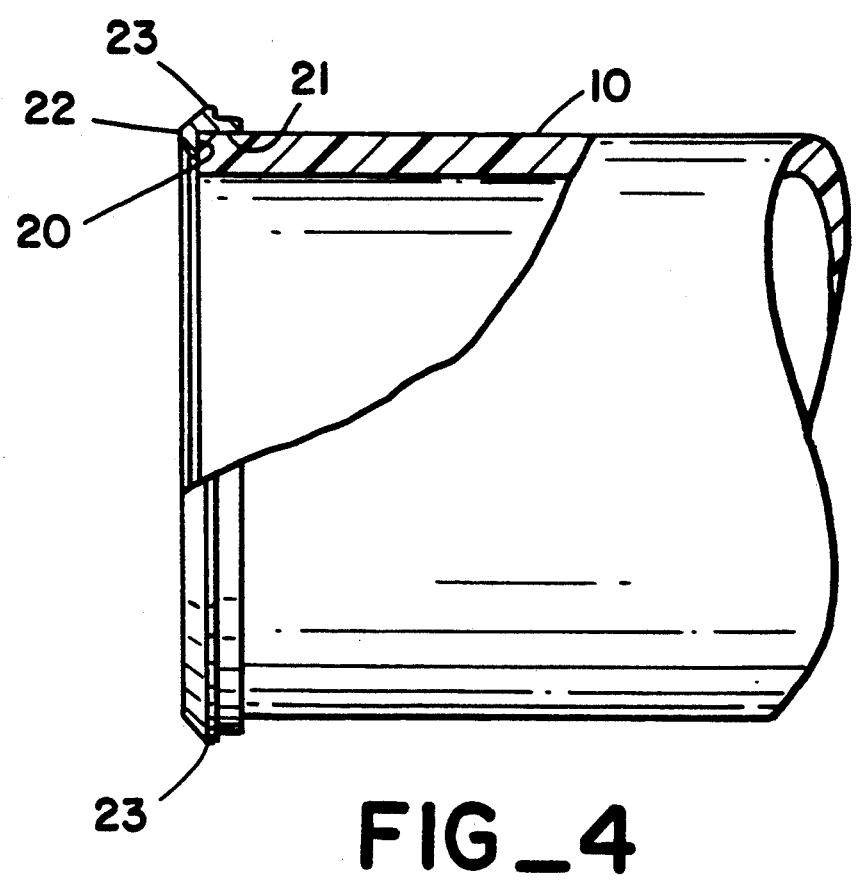
FIG_4

JOINT LOCKING SYSTEM FOR PIPE

FIELD OF THE INVENTION

The present invention relates to a system for joining and locking a plastic fitting to a pipe.

BACKGROUND OF THE INVENTION

Where a pipe is joined to plastic, e.g., polyethylene fittings, couplings, structures or other pipe by an elastomeric gasket, such as in a bell and spigot joint, considerable interference between the spigot (or pipe) outer surface and the inner surface of the plastic bell is required to effect a water tight or low pressure resistant seal. Because of this interference, a large measure of force is required to assemble the joint. This joining force develops considerable ring tensile strain in the plastic bell. The bell can then exert enough ring compression on the spigot so that when the joining force is released, the spigot will be forced or "squeezed" back out of the bell, and the joint will come apart. This problem, which is sometimes referred to as "back out", is magnified when both the bell and spigot are made of plastic.

One attempt to overcome this problem has been to use a lubricant on the bell surface and the gasket in an effort to minimize the joining force required to join the bell and spigot. However, the use of lubricant in this way only exacerbates the problem, since it also lowers the amount of ring compression required to force the spigot back out of the bell.

A common joint for plastic pipe, couplings and fittings involves the use of an O-ring held in an annular groove near the end of the pipe. The end of the pipe with the O-ring on it is inserted into a bell attached to a fitting, coupling or other piping structure. However, this jointing system suffers from the "back out" problem discussed above. Another method for joining plastic pipe involves the use of a shoulder gasket at the end of the pipe. This jointing assembly is particularly affected by the "back out" problem because the ring compression force is applied to the very end of the pipe, i.e., where the gasket is in contact with the inner surface of the bell.

A plastic pipe joining system has now been discovered which overcomes the "back out" problem described above, while at the same time permitting the use of a shoulder gasket of the end of the pipe.

SUMMARY OF THE INVENTION

In accordance with the present invention there is provided a slip fit type joint for connecting a smooth walled end portion of a pipe to fittings or other pipe comprising:

(a) a generally cylindrical pipe having at least one smooth walled end and a generally annular gasket attached to the end such that the gasket contacts both the end surface of the pipe and the outer surface of the pipe adjacent its end;

(b) a generally cylindrical plastic bell attached to the end of a fitting or pipe, the bell having, at its unattached end:

(i) a first inner bell surface which tapers inwardly from a first inside diameter at the unattached end of the bell, the first inside diameter being greater than the outside diameter of the gasket, to a second inside diameter which is greater than the outside diameter of the smooth walled end of the pipe to which the gasket is attached, but smaller than the outside diameter of the gasket;

(ii) a second inner bell surface, inward of and adjoining the first inner bell surface, having an inside diameter essentially the same as the second diameter of the first inner bell surface; and (iii) a third inner bell surface, inward of and adjoining the second inner bell surface, having an inside diameter greater than the inside diameter of the second inner bell surface, but smaller than the outside diameter of the gasket;

the pipe with the attached gasket being telescopically fittable into the bell such that the gasket fits inward of and abuts the second inner bell surface.

In a preferred embodiment of the present invention the gasket has a first inner gasket surface which is vertical and contacts the end surface of the pipe, and a second inner gasket surface which is horizontal and contacts the outer surface of the pipe adjacent its end.

In another preferred embodiment of the present invention the gasket widens, from a point at the front of the gasket which is approximately even with the outer surface of the pipe, inward and outward away from the bell.

BRIEF DESCRIPTION OF THE DRAWINGS

FIG. 1 illustrates a typical plastic pipe joint system currently in use.

FIG. 2 illustrates the joint system of the present invention.

FIG. 3 is an expanded view of the bell employed in the joint system of the present invention.

FIG. 4 is an expanded view of the shoulder gasket employed in the joint system of the present invention.

DETAILED DESCRIPTION OF PREFERRED EMBODIMENTS

In a typical system for joining a pipe to a plastic fitting, coupling or another plastic pipe, a so-called "bell and spigot" joining system is used. FIG. 1 illustrates such a typical system. In FIG. 1, the spigot 1 is an essentially cylindrical, smooth walled plastic pipe having shoulder gasket 2 attached to one end. The bell assembly 3 is also essentially cylindrical, and is attached to the end of the pipe or fitting 4 to which the spigot is to be joined. To join the two pieces, spigot 1, with attached gasket 2, is telescopically fit into bell 3. However, as noted above, this can result in "back out" of the spigot after assembly, resulting in the joint coming apart.

It has now been discovered that this "back out" problem can be prevented via a "locking wedge" in the bell. Referring to FIG. 2, a pipe having an essentially cylindrical, smooth walled end 10 has an essentially annular shoulder gasket 11 attached at the end such that the gasket contacts both the end surface of the pipe and its outer surface adjacent the end. (As used herein, the term "attached" means that the pipe and gasket may be separate pieces which are held together by, for example, a force fit or with an adhesive or the like. However, that term also includes the case where the pipe and gasket are one integral piece.) On gasket 11, the inside diameter of the portion contacting the end surface of pipe 10 has an inside diameter the same as or slightly larger than the inside diameter of pipe 10, and smaller than the outside diameter of pipe 10. The portion of gasket 11 which contacts the outer surface of pipe 10 has an inside diameter the same as or, preferably, slightly smaller than the outside diameter of pipe 10. The slightly smaller inside diameter is preferred since the gasket can then be stretched over the end of the pipe and held in place by tension. The outside diameter of the portion of the gasket which contacts the outer surface of the pipe is larger than the outside diameter of the pipe, greater than the inside diameter of the third inner bell surface, but smaller than the outside diameter of the bell.

The bell assembly 12 is also essentially cylindrical and is attached to one end of essentially cylindrical pipe or fitting 13. Referring now to FIG. 3, bell 12 has, at the end not attached to pipe or fitting 13, a first inner bell surface 14 which tapers inwardly from a first inside diameter 15 at the end of the bell which is greater than the outside diameter of the gasket, to a second inside diameter 16 which is greater than the outside diameter of the pipe, but smaller than the outside diameter of the gasket. Bell 12 has a second inner bell surface 17 which is located inward of and adjoins first inner bell surface 14. Second inner bell surface 17 has an inside diameter essentially the same as the second inside diameter 16 of first inner bell surface 15. Bell 12 also has a third inner bell surface 18 which is located inward of and adjoins second inner bell surface 17. Third inner bell surface 18 has an inside diameter 19 greater than the inside diameter of second inner bell surface 17, but smaller than the outside diameter of the gasket. As used herein, the term "locking wedge" refers to the shape formed by the combination of first inner bell surface 14, second inner bell surface 16 and third inner bell surface 18.

Referring again to FIG. 2, when the spigot and bell are joined, pipe 10 and gasket 11 fit telescopically into bell 12. In so doing, gasket 11 contacts first inner bell surface 14 and is compressed by it as gasket 11 is forced into the bell, due to the inward taper of first inner bell surface 14. Likewise, bell 12 deforms outward due to the outward force exerted on it by pipe 10 and gasket 11. The gasket reaches its greatest compression when it reaches second inner bell surface 17. As gasket 11 continues to be forced into bell 12, it reaches third inner bell surface 18 whereupon gasket 11 expands, but is still maintained under compression due to the fact that the inside diameter of third inner bell surface 18 is smaller than the outside diameter of gasket 11. Likewise, the outward force exerted on bell 12 decreases, allowing it to "snap" back to nearly its original shape. Preferably, after assembly of the joint is completed, bell 12 will be flared outward slightly. This exerts some ring compression on the gasket and pipe which helps maintain compression of the gasket, and hold the gasket and pipe in place.

Upon removal of the assembly force, the pipe and gasket may start to slide back, out of the bell. However, since second inner bell surface 17 has an inside diameter 16 which is smaller than the inside diameter of third inner bell surface 18, second inner bell surface 17 now forms a "lip" or barrier against which gasket 11 will abut, thereby preventing pipe 10 and gasket 11 from being forced out of bell 12.

The ring compression force exerted by the bell, and causing the "back out" force also acts to create a high degree of frictional force between the gasket and both the third inner bell surface and the outer surface of the pipe. Preferably, there is no lubricant between the gasket and the pipe, so this frictional force is sufficient to prevent the pipe from sliding out of the bell. Thus, the joint stays assembled.

In a preferred embodiment, the shoulder gasket has two inner surfaces which are essentially perpendicular to each other. Referring to FIG. 4, the first inner gasket surface 20 is vertical and contacts or mates with the end surface of pipe 10. The second inner gasket surface 21 is horizontal and adjoins the first inner gasket surface. This second inner gasket surface contacts or mates with the outer surface of pipe 10 adjacent its end. In another preferred embodiment, the gasket widens, from a point 22 at the front of the gasket (i.e., the end facing the bell) which is approximately even with the outer surface of pipe 10, inward and outward away from the bell. The outer portion of the taper forms a flange 23 on the outside of the gasket, said flange having an outside diameter greater than the inside diameter of the third inner bell surface, but smaller than the outside diameter of the bell.

The joint system of the present invention provides several advantages over joint systems currently available. As noted above, the joint system of the present invention overcomes the aforementioned problem of "back out." Of equal or greater importance, though, is the fact that the joint system of this invention permits easy assembly in the field. In order to assemble the joint system of this invention, one need only attach the shoulder gasket to the pipe by simply stretching it over the end of the pipe, and then inserting the pipe into the bell. Thus, complicated and time consuming milling operations, such as would be required if an O-ring were used instead of the shoulder gasket of this invention, are avoided. The only operation which may need to be performed in assembling the joint system of this invention is to cut the pipe to the desired length (if necessary), and this can be performed on-site in the field.

The joint system of the present invention is useful for a variety of sizes of pipe and fittings. However, it is especially useful for relatively large diameter pipe, such as that used for sewers or in the construction of manholes. Since these pipes are so large and relatively heavy, the ease of assembly which the present invention provides is particularly advantageous.

Typically, the bell of the joint system of the present invention is made from a plastic material which is at least slightly deformable at ambient temperature. While polyethylene is a preferred plastic since it is most susceptible to deformation at ambient temperature, other plastics, such as polypropylene, may also be used. It is essential that the bell be made of a plastic which is deformable at ambient temperature so that it can stretch slightly as the pipe and gasket are inserted into it, and then "snap" back to essentially its original shape when the gasket reaches the third inner bell surface. Typically, the other parts of the joint system (except the gasket) will also be made of plastic. However, it should be noted that not all of the parts of the joint system of the present invention need be made of plastic. For example, the pipe may be made of metal or other non-deformable material.

The choice of material for the shoulder gasket is not critical. It should, however, be deformable at ambient temperature and be capable of returning to its original shape once the deforming force is removed. Typically, the shoulder gasket will be made of an elastomeric material such as polyisoprene or neoprene.

While the portion of the pipe or fitting which fits into the shoulder gasket and bell should be smooth walled in order to form a good seal with the gasket and bell, the remainder of the pipe and/or fitting need not be smooth walled. In one embodiment of the present invention, the pipe is made by helically winding plastic tubes or strips onto a mandrel. Thus, the resulting pipe is not smooth walled, except at the end(s) mating with the gasket and/or bell. Such pipes, and the method of making them, are described in U.S. Pat. No. 4,826,423, issued May 2, 1989 to Kemp et al.; U.S. Pat. No. 4,848,407, issued Jul. 18, 1989 to Smith et al.; U.S. Pat. No. 4,678,526, issued Jul. 7, 1987 to Hawerkamp; U.S. Pat. No. 4,510,004, issued Apr. 9, 1985 to Hawerkamp; U.S. Pat. No. 4,466,854, issued Aug. 1, 1984; U.S. Pat. No. 3,690,993, issued Sep. 12, 1972 to Hawerkamp; U.S. Pat. No. 3,617,415, issued Nov. 2, 1971 to Hawerkamp; and U.S. Pat. No. 3,477,891, issued Nov. 11, 1969 to Hawerkamp, each of which is incorporated by reference herein.

What is claimed is:

1. A slip fit type joint for connecting a smooth walled end portion of a pipe to fittings or other pipe comprising:
    (a) generally cylindrical pipe having at least one smooth walled end and a generally annular gasket attached to the end such that the gasket contacts both the end surface of the pipe and the outer surface of the pipe adjacent its end;
    (b) a generally cylindrical plastic bell attached to the end of a fitting or pipe, the bell having, at its unattached end:
        (i) a first inner bell surface which tapers inwardly from a first inside diameter at the unattached end of the bell, the first inside diameter being greater than the outside diameter of the gasket, to a second inside diameter which is greater than the outside diameter of the smooth walled end of the pipe to which the gasket is attached, but smaller than the outside diameter of the gasket;
        (ii) a second inner bell surface, inward of and adjoining the first inner bell surface, having an inside diameter essentially the same as the second diameter of the first inner bell surface;
        (iii) a third inner bell surface, inward of and adjoining the second inner bell surface, having an inside diameter greater than the inside diameter of the second inner bell surface, but smaller than the outside diameter of the gasket; and
        (iv) a fourth inner bell surface which is essentially perpendicular to and connects the second and third inner bell surfaces;
    the pipe with the attached gasket being telescopically fittable into the bell such that the gasket fits inward of the fourth inner bell surface and abuts the third and fourth inner bell surfaces.

2. The joint of claim 1 wherein the gasket has a first inner gasket surface which is vertical and contacts the end surface of the pipe, and a second inner gasket surface which is horizontal and contacts the outer surface of the pipe adjacent its end.

3. The joint of claim 1 wherein the gasket widens, from a point at the front of the gasket which is approximately even with the outer surface of the pipe, inward and outward away from the bell.

4. The joint of claim 3 wherein the gasket has a flange on the outside of the gasket, said flange having an outside diameter greater than the inside diameter of the third inner bell surface, but smaller than the outside diameter of the bell, and having one surface which adjoins and is essentially perpendicular to the outer surface of the portion of the gasket which contacts the outer surface of the pipe.

5. The joint of claim 1 wherein the bell is made of polyethylene.

6. The joint of claim 5 wherein the pipe is made of polyethylene.

7. The joint of claim 6 wherein the pipe is helically wound.

* * * * *